United States Patent [19]

Smith et al.

[11] Patent Number: 5,054,082

[45] Date of Patent: Oct. 1, 1991

[54] METHOD AND APPARATUS FOR PROGRAMMING DEVICES TO RECOGNIZE VOICE COMMANDS

[75] Inventors: Paul F. Smith; Kamyar Rohani, both of No. Richland Hills, Tex.

[73] Assignee: Motorola, Inc., Schaumburg, Ill.

[21] Appl. No.: 499,575

[22] Filed: Mar. 26, 1990

Related U.S. Application Data

[63] Continuation of Ser. No. 213,409, Jun. 30, 1988, abandoned.

[51] Int. Cl.$^5$ ................................................ G10L 5/00
[52] U.S. Cl. .................................... 381/42; 364/513.5
[58] Field of Search ...................................... 389/41-46, 389/110; 364/513.5; 379/58-63, 88-89, 355

[56] References Cited

U.S. PATENT DOCUMENTS 4,737,976  4/1988  Borth et al. ............................ 379/58

FOREIGN PATENT DOCUMENTS

0041195A1  6/1981  European Pat. Off. .

Primary Examiner—Emanuel S. Kemeny
Attorney, Agent, or Firm—Juliana Agon

[57] ABSTRACT

To program a communication device to respond to voice commands, an individual desiring to operate the communication device sends a message to a repository of voice recognition codebooks. The repository device(s) responds by transmitting the codebook of that individual to at least one communication device, which stores the codebook therein. Thereafter, the communication device may respond to the voice commands of that individual.

20 Claims, 3 Drawing Sheets

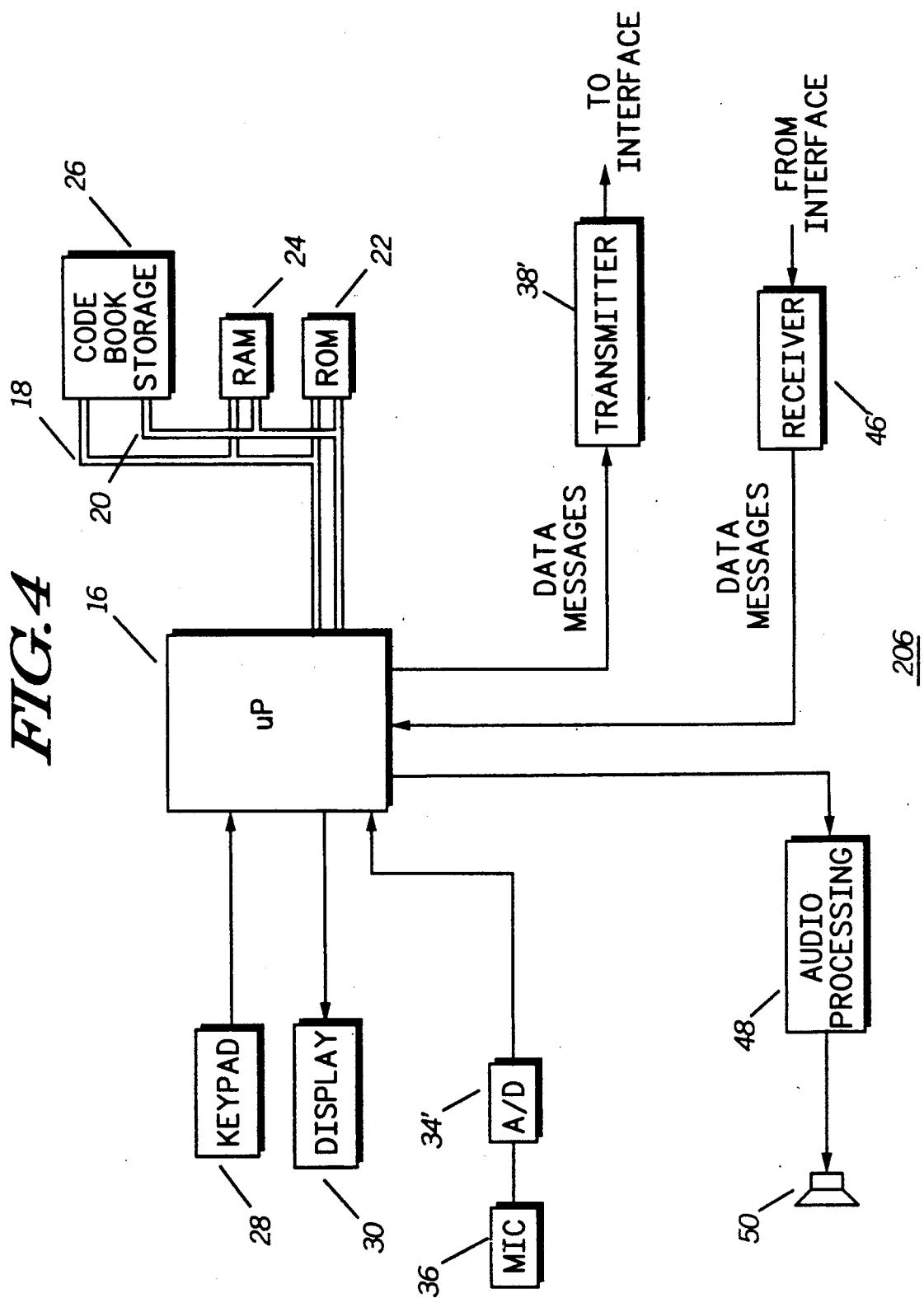

METHOD AND APPARATUS FOR PROGRAMMING DEVICES TO RECOGNIZE VOICE COMMANDS

This is a continuation of application Ser. No. 07/213,409, filed June 30, 1988, and now abandoned.

TECHNICAL FIELD

This invention relates generally to voice recognition, and more particularly to speaker dependent voice recognition applied to information communication systems, and is more specifically directed toward a method for programming communication devices to recognize and respond to voice commands.

BACKGROUND ART

Voice recognition technology has been recognized as an advantageous feature for many product applications. Such technology may be employed to render a product partially or entirely controllable by voice commands in situations where hands-on control is impossible or impracticable. Presently, however, voice recognition technology has not found wide use due to the complexity of its implementation, and requirements for a large amount of electronic storage (memory).

Speaker dependent voice recognition devices are designed to respond to a particular individual. Stored within such devices are speaker specific parameters, such as, for example, variations in the vocal tract response, pitch period, short-term speech power, and amplitude of the short-term speech spectra. In order for a speaker dependent device to respond to more than one person, the voice recognition information (commonly referred to as a "codebook") for each person must be stored within the device. However, mass codebook storage may prove impractical due to space or cost considerations. An alternative may be to use speaker independent technology, however, speaker independent devices are typically more complex and less accurate.

When applied to information communication devices, voice recognition technology raises several concerns. One major concern comprises the recognition that communication devices are typically used by more than one individual. For example, police vehicles are generally in service for three eight-hour shifts, during which at least three officers use the vehicle. Moreover, the officers using the vehicle (radio) may be anyone on the entire police force. Therefore, each radio must contain a codebook for each officer on the force. This would significantly increase the cost of the radios. Additionally, codebook maintenance costs would be significant since the radios must be updated with each change in personnel. Another concern is the increase in radio size. Contemporary state-of-the-art communication devices are designed so as to minimize their physical size. The addition of several memory devices, or a memory printed circuit board, may increase the size of the device beyond that desired by the consuming public. This is a particular concern in the personal pager and handheld radio products.

One solution may be to store the codebooks of only a few individuals thereby reducing the amount of required memory. However, this approach is inflexible to changing circumstances such as variations in personnel working hours or in the event that the radio itself should fail. Another approach may be to have each radio contain only enough memory for a single codebook, which must be retrained for each person. Speaker dependent voice recognition devices must be "trained" to respond to each individual. Training is accomplished by having an individual repeat control words several times until the device has been "trained" to recognize that word as spoken by that individual. However, training is a time consuming process and may be very inefficient in certain markets, such as police and fire protection, where rapid activity is ordinarily required. Accordingly, a need exists in the art to permit information communication devices to be programmed to respond to the voice commands of several individuals in an efficient and organized manner.

SUMMARY OF THE INVENTION

Briefly, according to the invention, an individual desiring to operate a communication device via voice commands sends a message to a repository of voice recognition codebooks requesting access to a particular codebook. The repository device(s) respond by transmitting the codebook of that individual to at least one communication device, which stores the codebook therein. Thereafter, the communication device may respond to the voice commands of that individual. In this way, the communication device may be rapidly reprogrammed to accommodate changing operators.

BRIEF DESCRIPTION OF THE DRAWINGS

FIG. 4 is a block diagram of a computer (or terminal) operable in the computer network of FIG. 3.

DETAILED DESCRIPTION OF THE PREFERRED EMBODIMENT

Figure 1:
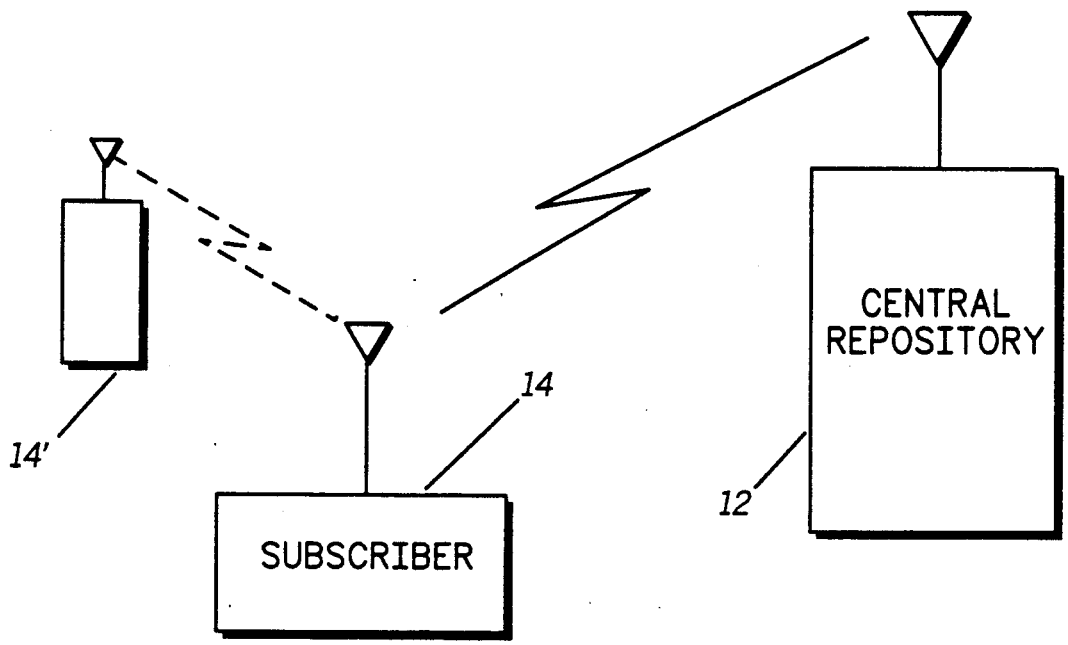
FIG. 1 is an illustration of a communication system incorporating the invention.

Referring now to FIG. 1, there is shown a two-way radio frequency communication system (10) comprising a central repository station (12), which may communicate with a plurality of subscribers (two shown). Subscriber units may be mobile units, portable units, or control stations. Generally, a portable subscriber unit is designed to be carried on or about the person, a mobile subscriber unit is designed to be mounted into vehicles, and control stations are permanent or semi-permanent installations installed in buildings or other fixed locations. As used herein, the term subscribers collectively refers to portable units, mobile units or control stations.

According to the invention, all required codebooks for all personnel using the communication system (10) are centrally contained in the repository (12). The central repository (12) is preferably associated with a facility that may be used to provide "training" of the subscriber units. For example, all codebooks for an entire police force may be created and maintained at the police station. New police officers (radio operators) may create a personal codebook by training a subscriber unit (or its simulated equivalent) at the police station. Optionally, a personal codebook may be created by training a subscriber unit (14), after which the codebook is transmitted (uploaded) to the central repository (12) for storage and maintenance. In this way, the codebook library may be maintained. Alternately, the repository may be distributed among several locations within a given geographic area. However, this approach may require tighter controls and coordination to adequately maintain the codebook libraries.

Each of the subscriber units contain enough codebook memory to store the codebook for at least one individual. Thus, before an individual may operate the subscriber unit via voice commands, his or her codebook must be transferred (down-loaded) from the central repository (12) to the subscriber unit (14). Preferably, an individual desiring to operate a subscriber unit (14) may transmit a message to the central repository (12) identifying and requesting a particular codebook from the codebook library.

The present invention contemplates several alternatives to generating the codebook request message. In a first embodiment, an identification code may be entered on a keypad (or equivalent) and transmitted to the central repository (12). Alternately, each system user may have an identification card (or module) that may be inserted into the subscriber unit, which causes an automatic generation and transmission of an appropriate codebook request message to the central repository (12). In another embodiment, the radio operator may verbally inform the repository operator (if any) the identification number of his or her codebook and the vehicle to which the codebook should be transmitted. In a further embodiment, an operator may contact the repository via a conventional telephone network and transmit the codebook identification code, such as, by using the keypad of the telephone. Finally, the system may employ a limited version of speaker independent voice recognition technology, which may be used to generate the codebook down-load request. The speaker independent portion of the system may be implemented either at the subscriber (14) or at the central repository (12). In this way, a voice recognition system having partially speaker independent, and partially speaker dependent controls may allow hands-free programming as well as hands-free operation.

In several circumstances, the operator of a mobile subscriber (14) also carries an associated portable subscriber (14'), which may be used to maintain communication when the operator is out of the vehicle. Accordingly, the present invention contemplates that the mobile subscriber (14) may optionally repeat the received codebook to its associated portable (14') to ease communication traffic between the several subscribers and the central repository (12).

Once the codebook has been stored in a subscriber unit (14), the operator may partially (or entirely) control the operation of the subscriber unit by voice commands. Alternately, voice commands may be used in conjunction with manually entered commands (or vice versa) to execute a desired function. Whenever another individual desires to use that subscriber unit (for example, at a change in a working shift), the codebook for the new operator may be rapidly down-loaded as described above. Optionally, the memory in the subscriber may be expanded (within size and cost constraints) to retain a limited number of the last used codebooks in a first-in-last-out manner. For example, the codebook of the current user and the prior two operators may be retained in the subscriber unit. In this way, if the same three individuals operating the subscriber during the three operating shifts were ordinarily repeated day-to-day, no codebook reprogramming of the subscriber unit would be required.

In another embodiment, the present invention contemplates that the central repository (12) may contain a data base of the operators and the associated subscribers that they customarily operate. At each shift change, the central repository (12) may automatically down-load the codebook for the next operator based upon time of day (or other suitable parameters). If a change in personnel occurs, due to illness or unavailability, a supervisor may enter a new name into the roster (data base), and that individual's codebook may be automatically down-loaded to the subscriber unit. This approach has the advantage of minimizing the over-the-air requests for new codebooks to those situations where a change in operator occurs unexpectedly.

Figure 2:
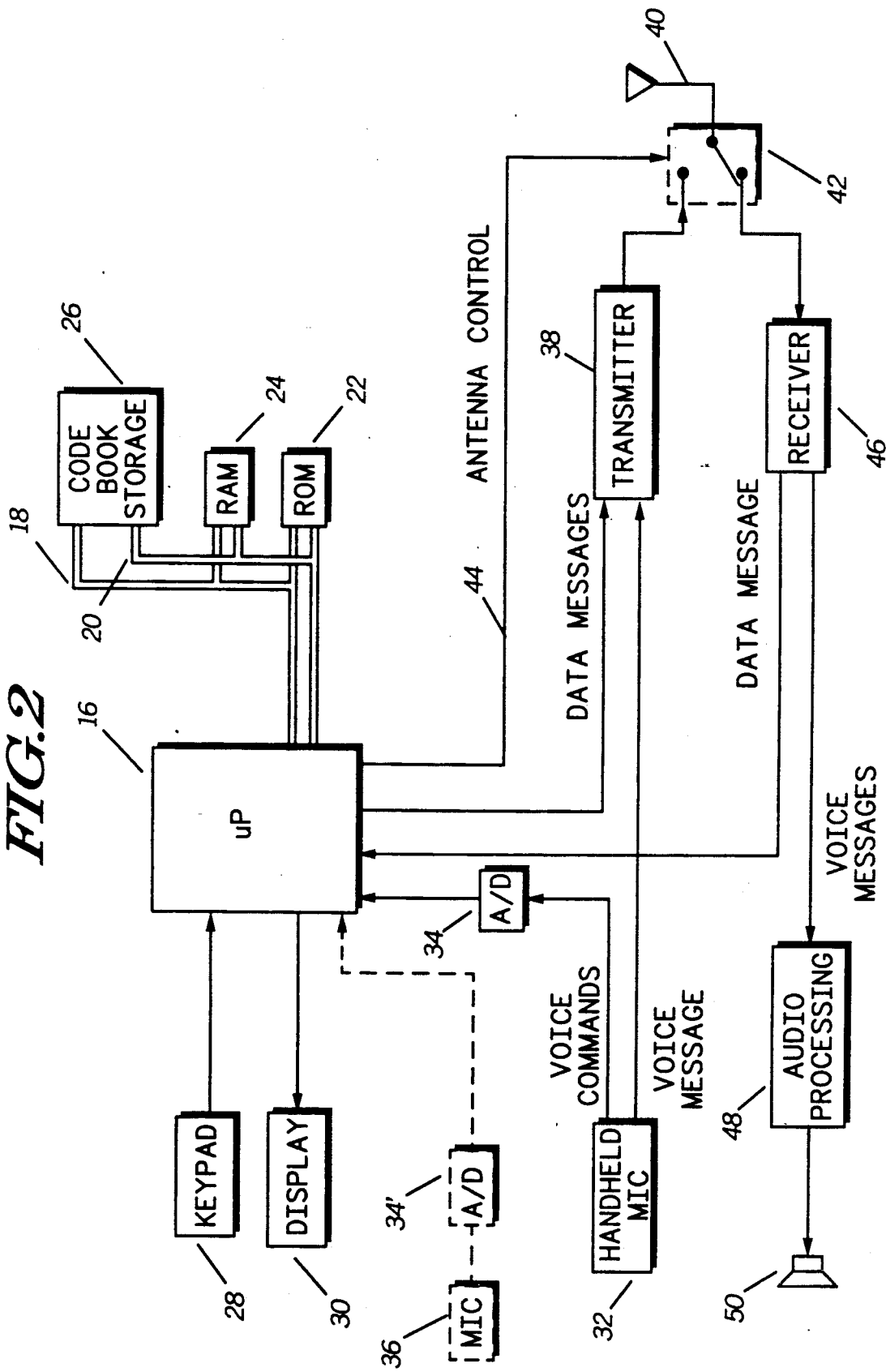
FIG. 2 is a block diagram of the subscriber unit of FIG. 1.

Referring now to FIG. 2, there is shown a block diagram of a subscriber unit (14 or 14'). The subscriber unit 14 operates under the control of a microprocessor (16), which communicates via an address bus (18) and a data bus (20) with read-only memory (ROM) (22) and random access memory (RAM) (24). The codebook for each individual resides in the codebook storage (26), which preferably comprises electronically erasable programmable read-only memory (EEPROM). Alternately, battery backed-up random access memory (RAM) may be used.

The operator may enter manual commands via the keyboard (28), and receive status or information updates by the display (30). Preferably, voice commands are entered via the handheld microphone (32), which are digitized (34) and processed by the microprocessor (16). Optionally, a condenser microphone (or equivalent) (36) may be mounted on the subscriber unit, to receive voice commands without the necessity of picking up the handheld microphone (32). Voice messages are transmitted via the handheld microphone (32) and the transmitter (38), which may also transmit data messages from the microprocessor (16). The transmitter is selectively coupled to the antenna (40) via the antenna switch (42), which is controlled via the antenna control line (44) from the microprocessor (16). The subscriber unit (14) may also receive data or voice messages via the receiver (46), which forwards data messages to the microprocessor (16), while routing voice messages to any suitable audio processing stages (48), which may provide the voice messages to the operator via the speaker (50).

According to the invention, a significant level of voice control, may be accomplished by a limited word set. While total voice control may require several additional words, the present invention contemplates that the subscriber unit may be at least partially controlled by the word set as represented in Table 1 below.

TABLE 1

EMERGENCY
LIGHTS
SIREN
ON
OFF
MONITOR
CANCEL
DELETE
LOCK
RESET
ALERT
HOLD
PRINT
STATUS
TRANSMIT
RECEIVE
DISPLAY

TABLE 1-continued

```
SCAN
DIAL
CALL
CHANNEL
ACKNOWLEDGE
MESSAGE
NUMBER
ZERO
ONE
TWO
THREE
FOUR
FIVE
SIX
SEVEN
EIGHT
NINE
```

Figure 3:
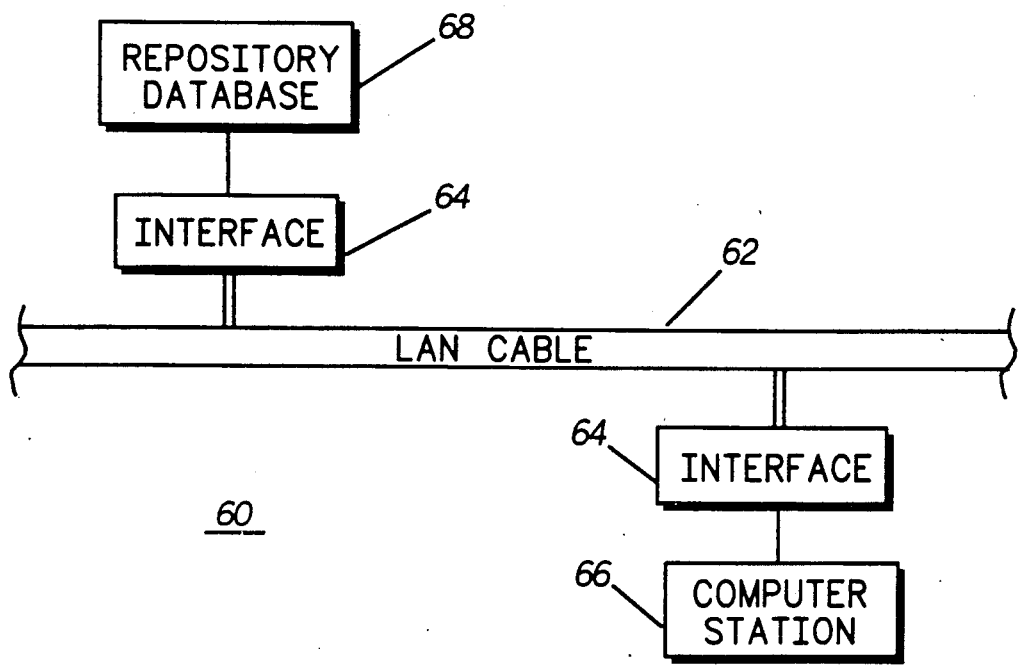
FIG. 3 is an illustration of a local area networked computer system incorporating the invention.

Referring now to FIG. 3, a local area network (LAN) computer system (60) incorporating the invention is shown. The LAN system (60) includes a LAN communication cable (62), which is coupled to at least one computer (or terminal) via an interface (64) (optionally, the interface (64) may reside within the computer or terminal (66)). According to the invention, the LAN computer system (60) also includes at least one repository data base (68), which is coupled to the LAN cable (62) via an interface (64), and contains the codebook library for the LAN system (60). To program a computer (or terminal) (66) to respond to voice commands, an operator preferably transmits a codebook request message to the repository (68) via the LAN cable (62). A particular codebook is returned via the LAN cable to the requesting computer (or terminal), which may thereafter be at least partially controlled by voice commands. As discussed in conjunction with FIG. 1, the present invention contemplates a variety of methods for generating the codebook request. Such methods include, but are not limited to: entering an identification code on a keyboard or the like; inserting an identification card (or module) into a card reader; or the partial use of speaker independent voice recognition for the purpose of generating the codebook request, after which the computer (or terminal) (66) may be operated using speaker dependent voice recognition technology.

Referring now to FIG. 4, a computer (or terminal) (66) is shown in block diagram form. The computer (or terminal) (66) operates under the control of a microprocessor (16), which communicates via an address bus (18) and a data bus (20) with read-only memory (ROM) (22) and random access memory (RAM) (24). The codebook for the operator resides in the codebook storage (26), which preferably comprises electronically erasable programmable read-only memory (EEPROM). Alternately, battery backed-up random access memory (RAM) may be used.

The operator may enter manual commands via the keyboard (28) or a "mouse" (not shown), and receive information via the display (30). According to the invention, voice commands are received via a condenser microphone (or equivalent) (36), which commands are digitized (34') prior to being processed by the microprocessor (16). Voice commands are used to at least partially control the computer (or terminal) (66), and may be used in conjunction with manually entered commands from the keyboard (28). The computer (or terminal) (66) receives information from (46') and transmits information to (38') the LAN system (60) via the LAN cable (62) and interface (64). Additionally, error messages or electronically generated tones or speech may be provided from the microprocessor (16) to the operator via any suitable audio processing stages (48) and a speaker (50).

What is claimed is:

1. In a communication system having at least one communication unit being at least partially controlled by voice commands, and at least one remote repository station having a data base comprising at least voice recognition information for more than one individual, a method for programming said at least one communication unit to recognize voice commands of at least one individual, comprising the communication unit steps of:
   requesting particular voice recognition information of one individual from said remote repository station;
   receiving data representing a selection by said repository station of particular voice recognition information of said one individual among other individuals from said remote repository station via a radio frequency receiving means; and
   storing at least a portion of the data representing said particular voice recognition information.

2. The method of claim 1, wherein the communication unit requesting step comprises of: transmitting a radio frequency message comprising a request for particular voice recognition information to said repository station prior to receiving said data representing particular voice recognition information from said repository station.

3. The method of claim 2, wherein said transmitting step comprises: entering a code on a keypad, and transmitting a radio frequency signal having at least a data packet representing said code as at least a portion of said message.

4. The method of claim 2, wherein said transmitting step comprises: transmitting a radio frequency signal having at least a data packet representing at least an identification code as at least a portion of said message.

5. The method of claim 2, wherein said transmitting step comprises:
   (a) receiving a voice signal comprising a command to retrieve said data representing voice recognition information;
   (b) processing said voice signal in a speaker independent voice recognition means to provide a data packet;
   (c) transmitting a radio frequency signal having at least said data packet as at least a portion of said message representing a request for particular voice recognition information.

6. The method of claim 1, which includes the communication unit step of: processing voice commands at said communication unit in accordance with said data representing particular voice recognition information to at least partially control operation of said communication unit in response to said voice commands.

7. The method of claim 1, which includes the communication unit steps of:
   (i) processing, in the absence of manually entered commands, voice commands in accordance with said data representing particular voice recognition information to at least partially control operation of said communication unit in response to said voice commands;
   (ii) processing, when said manually entered commands are present, said manually entered commands in cooperation with said voice commands processed in accordance with said data representing particular voice recognition information to at least partially control operation of said communication unit in response to said manually entered commands and said voice commands.

8. The method of claim 1, which includes the communication unit step of: re-transmitting said data representing particular voice recognition information to another communication unit via a radio frequency transmitting means.

9. In a communication system having at least one computer or terminal being at least partially controlled by voice commands, at least one remote repository station having a data base comprising at least voice recognition information for more than one individual, and a computer communication network intercoupled between said computer or terminal and said repository station, a method for programming said at least one computer or terminal to recognize said voice commands of at least one individual, comprising the computer or terminal steps of:
(a) transmitting, via an interface means, a message comprising a request of particular voice recognition information of one individual to said remote repository station over the computer communication network;
(b) receiving, via said interface means, data representing a selection by said remote repository stations of particular voice recognition information of said one individual among the individuals from said repository station over the computer communication network;
(c) processing voice commands at said computer or terminal in accordance with said data representing said particular voice recognition information to at least partially control operation of said computer or terminal in response to said voice commands.

10. The method of claim 9, wherein said transmitting step comprises: entering a code on a keypad of the computer or terminal, and transmitting via said interface at least a data packet representing said code as at least a portion of said message to said repository station over the computer communication network.

11. The method of claim 9, wherein said transmitting step comprises: transmitting via said interface a data packet representing at least an identification code as at least a portion of said message to said repository station over the computer communication network.

12. The method of claim 9, wherein said transmitting step comprises:
(a) receiving, at the computer or terminal, a voice signal comprising a command to retrieve said data representing voice recognition information;
(b) processing said voice signal in a speaker independent voice recognition means to provide a data packet;
(c) transmitting via said interface at least said data packet as at least a portion of said message representing a request for particular voice recognition information to said repository station over the computer communication network.

13. The method of claim 9, which includes the computer to terminal step of: (b1) storing said data representing particular voice recognition information received form the repository station over the computer communication network.

14. The method of claim 9, which includes the step of:
(d) re-transmitting over the computer communication network said data representing particular voice recognition information to at least one other computer or terminal.

15. The method of claim 9, wherein said processing step comprises:
(i) processing, in the absence of manually entered commands, voice commands in accordance with said data representing particular voice recognition information to at least partially control operation of said communication unit in response to said voice commands;
(ii) processing, when said manually entered commands are present, said manually entered commands in cooperation with said voice commands processed in accordance with said data representing particular voice recognition information to at least partially control operation of said communication unit in response to said manually entered commands and said voice commands.

16. In a communication system having at least one subscriber unit being at least partially controlled by voice commands, and at least one remote repository station having a data base comprising at least voice recognition information for more than one individual, a method for programming said at least one subscriber unit to recognize said voice commands of at least one individual, comprising the steps of:
at said at least one remote repository station:
(a) transmitting, automatically, data representing a selection by said remote repository station of particular voice recognition information of one individual among other individuals to at least one subscriber unit in response to a predetermined event;
at said at least one subscriber unit:
(a) receiving said data representing said particular voice recognition information from said repository station.

17. In a communication system having at least one subscriber unit being at least partially controlled by voice commands, and at least one remote repository station having a data base comprising at least voice recognition information for more than one individual, a method for maintaining said data base, completing the subscriber unit steps of:
(a) creating data representing voice recognition information;
(b) transmitting said data representing voice recognition information of one individual to said at least one remote central repository to be stored with voice recognition information of other individuals; and
(c) requesting particular voice recognition information of said one individual from said remote repository station.

18. In a communication system having at least one subscriber unit being at least partially controlled by voice commands, and at least one remote repository station having a data base comprising at least voice recognition information for more than one individual, a method for maintaining said data base, comprising the steps of:
at a first subscriber unit:
creating data representing voice recognition information;
transmitting at least said data representing voice recognition information to said at least one remote central repository; requesting particular voice recognition information of one individual from said remote repository station in a request to said repository station;

at said at least one repository station:

receiving at least said data representing voice recognition information from said first subscriber unit;

storing at least said data representing voice recognition information of said one individual with voice recognition information of other individuals;

receiving said request from said first subscriber unit;

selecting of said particular voice recognition information of said one individual among the individuals from said repository station in response to said request; and transmitting, upon said request at least said data representing said particular voice recognition information to said first subscriber unit.

19. In a communication system having at least one communication unit being at least partially controlled by voice commands, and at least one remote repository station having a data base comprising at least voice recognition information for more than one individual, a communication unit capable of recognizing voice commands of at least one individual, comprising:

means for requesting particular voice recognition information of one individual from said repository station;

radio frequency receiving means for receiving a selection by said repository station of data representing said particular voice recognition information of one individual among other individuals from said remote repository station via a radio frequency signal transmitted therefrom; and storing means for storing at least a portion of the data representing said particular voice recognition information.

20. In a communication system having at least one computer or terminal being at least partially controlled by voice commands, at least one remote repository station having a data base comprising at least voice recognition information for more than one individual, and a computer communication network intercoupled between said computer or terminal and said repository station, a computer or terminal capable of recognizing said voice commands of at least one individual, comprising:

interface means for interfacing the computer or terminal with the computer communication network for requesting particular voice recognition information of one individual from said remote repository station;

receiving means, coupled to the interface means, for receiving data representing a selection by said repository station of said particular voice recognition information of one individual among the individuals from said remote repository station over the computer communication network;

processing means for processing voice commands at said computer or terminal in accordance with said data representing said particular voice recognition information to at least partially control operation of said computer or terminal in response to said voice commands.

* * * * *

UNITED STATES PATENT AND TRADEMARK OFFICE
CERTIFICATE OF CORRECTION

PATENT NO. : 5,054,082
DATED : October 1, 1991
INVENTOR(S) : Smith et al.

It is certified that error appears in the above-identified patent and that said Letters Patent is hereby corrected as shown below:

Column 7, claim 9, line 30, delete "the" and insert therefor --other--.

Column 8, claim 15, line 10, delete "communication unit" and insert therefor --computer or terminal--; lines 17 and 18, delete "communication unit" and insert therefor --computer or terminal--.

Signed and Sealed this

Twenty-eighth Day of June, 1994

Attest:

BRUCE LEHMAN

Attesting Officer

Commissioner of Patents and Trademarks